United States Patent [19]

Johnson

[11] Patent Number: 4,739,747
[45] Date of Patent: Apr. 26, 1988

[54] MULTI PURPOSE HEATER FOR ICE FISHING

[76] Inventor: Walter I. Johnson, 2016 A S. Hilbert, Milwaukee, Wis. 53207

[21] Appl. No.: 37,516

[22] Filed: Apr. 13, 1897

[51] Int. Cl.⁴ ............................................. F24H 1/06
[52] U.S. Cl. .................................. 126/271.1; 239/136
[58] Field of Search ........................... 126/269, 271.1; 239/136; 43/4

[56] References Cited

U.S. PATENT DOCUMENTS

| | | | |
|---|---|---|---|
| 130,167 | 8/1872 | Weaver | 239/136 X |
| 682,762 | 9/1901 | Souder et al. | 126/271.1 |
| 975,284 | 3/1910 | Roberts et al. | 126/271.1 |
| 1,803,232 | 4/1931 | Carozzi | 99/313 |
| 2,383,732 | 8/1945 | Neirsbach | 248/94 X |
| 2,541,328 | 2/1951 | Boklep | 126/360 |
| 2,990,829 | 7/1961 | McDonough et al. | 126/271.2 |
| 3,424,547 | 1/1969 | Winniett | 21/92 |
| 3,507,268 | 4/1970 | Anderson | 126/271.3 |
| 3,545,118 | 12/1970 | Stelmach | 43/17 |
| 3,767,117 | 10/1973 | Baker | 239/136 |
| 4,006,732 | 2/1977 | Schumm | 126/271.1 |
| 4,294,030 | 10/1981 | Stewart | 43/4 |
| 4,612,910 | 9/1986 | Williams | 126/360 |

FOREIGN PATENT DOCUMENTS 1134993 12/1956 France .................. 126/271.1

Primary Examiner—Samuel Scott
Assistant Examiner—Allen J. Flanigan
Attorney, Agent, or Firm—William L. Falk

[57] ABSTRACT

A heating device useful in ice fishing includes a housing having a retractable heater core which carries a self-contained heating substance and a reservoir filled with an evaporable liquid. The heating substance is cooperable with the reservoir to provide vapor and liquid droplets to prevent freezing of water within a hole cut in the ice and is further operable to furnish convectional heating of objects placed at the top of the housing.

11 Claims, 3 Drawing Sheets

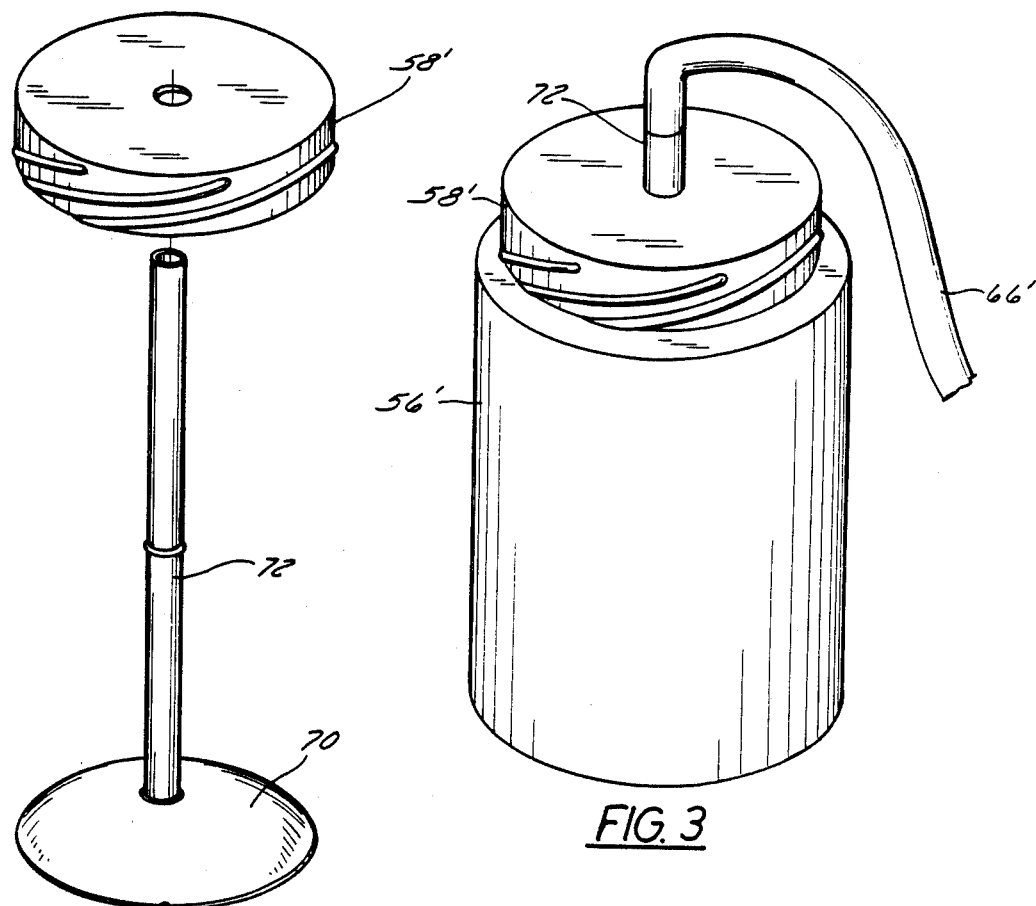
FIG. 3
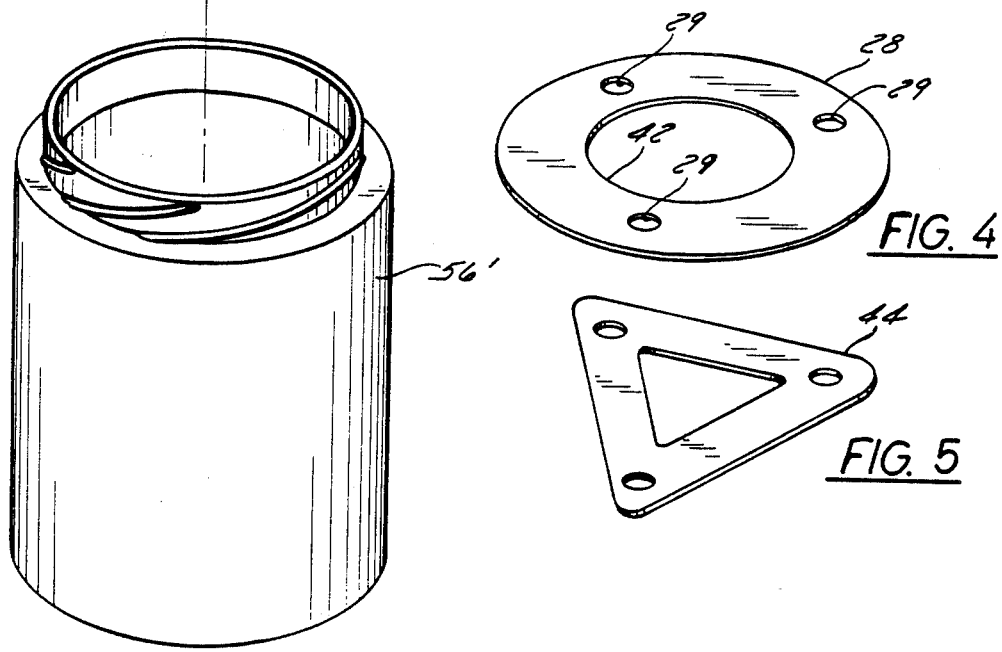
FIG. 2
FIG. 4
FIG. 5

MULTI PURPOSE HEATER FOR ICE FISHING

BACKGROUND OF THE INVENTION

This invention relates to improvements in heating devices, and, more particularly, to portable heaters used to maintain ice fishing holes open and provide auxiliary heating for comfort and cooking in frigid temperatures on the ice.

It is well known that in the sport ice fishing extremely cold weather conditions affect the comfort and patience of a fisherman. One of the most troublesome problems experienced is that once a hole has been bored in the ice surface to gain access to the lake, stream or river water below, it is very difficult to prevent refreezing of water within the hole. Once this happens, the fishing line and bobber eventually become frozen in the ice and the fisherman's ability in determining if bait is taken and in retrieving a hooked fish are definitely impaired. Rather than chopping and straining the ice repeatedly at a hole, it has been found desirable to develop various heating devices for maintaining the openness of the hole.

One group of prior art devices directed to solving the above problems, include heaters having housings adapted to be supported on the ice completely surrounding the hole such as shown in U.S. Pat. Nos. 3,507,268 to Anderson and 4,006,732 to Schumm. Other structures are provided with housings which depend from the ice into or above the hole as illustrated in U.S. Pat. Nos. 2,541,328 to Boklep, 2,990,829 to McDonough et al, and 4,294,030 to Stewart. All of these heaters use charcoal, propane gas or some type of liquid fuel to radiate heat around the hole so that refreezing will not occur.

Another species of heater is shown in U.S. Pat. No. 4,612,910 wherein a housing having a heat source is buoyantly supported in the hole. Deflecting means disperse heat from the center of the heater towards the walls of the hole.

Still another prior art device is shown in U.S. Pat. No. 3,545,118 to Stelmach which sets forth ice fishing equipment including a heater adapted to be placed adjacent one side of the hole. The heater directs heat downwardly to a portion of ice at one side of the hole, thereby melting the ice and feeding water to the hole.

Various attempts have been made by each of these patents to alleviate the reformation of ice within the hole. However, such structures remain complex and cumbersome, require high manufacturing costs, produce insufficient or dispersed heat levels, cause burning and/or tangling of the fishing line and exhibit varying degrees of stability when mounted in place.

Thus, there remains a well defined need in this art for a simple yet novel self-contained, portable structure which produces efficient heat transfer, such as by vaporized heat, to maintain the open water in the hole.

While unrelated to the extreme cold weather problems discussed above, U.S. Pat. No. 3,424,547 to Winniett discloses a unitary, plug-in vessel used to produce vaporized heat for sterilization and food heating purposes in the home.

Accordingly, it is a principal object of the invention to provide an improved self-contained, portable heating device to be used at an ice fishing site to prevent formation of ice within a hole cut in the ice.

Another object of the invention is to furnish a heating device which offers an auxiliary heating feature for comfort and cooking.

It is a further object of the invention to provide a heater positioned away from the hole so as not to obstruct fishing and yet produce efficient delivery of heat to the hole.

A still further object of the invention is to provide a sturdy yet lightweight, easily manufacturable heater which is convertible to various heating applications.

One of the salient features of the invention is a retractable heater core which may be rearranged depending on the heating purpose.

An attendant feature of the invention is a guide rod structure used to position internal components of the heater and provide a support for objects placed thereon.

A further feature of the invention resides in the mounting of the fuel source and the combustion control of the fuel source provided by a damping structure on the housing.

SUMMARY OF THE INVENTION

The present invention is directed to an improved heating device wherein a heating source is positioned within a housing and cooperable with a fluid reservoir for delivering vaporized heat to maintain an ice fishing hole open, and further operable to provide convectional heating of objects placed at the top of the housing.

In a preferred embodiment, the present invention contemplates a retractable heater core slidable into and out of a covered housing by means of guide rods extending axially of the housing. A self contained, displaceable heating source is mounted at the bottom of the core beneath a removable reservoir containing evaporable fluid. A damping device is formed in the housing for controlling combustion of the heat source. In one mode, the heat source is cooperable with the reservoir to provide vaporized heat to prevent freezing of water within the hole cut in the ice. In a second mode, the heat source by replacing the reservoir, provides direct heating for cooking of objects and warming of human extremities.

The various features of novelty which characterize this invention are pointed out particularly in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

The invention and its attendant objects and advantages will become better understood by reference to the following detailed description of the preferred embodiment when read in conjunction with the following drawings wherein:

FIG. 2 is an exploded view of a modified form of reservoir used in the present invention;

FIG. 3 is an assembled view of the reservoir shown in FIG. 2 provided with a capillary tube;

FIG. 4 is a perspective view of a base plate used in the heating device shown in FIG. 1;

FIG. 5 is a perspective view of an alternative base plate which may be used with the present invention;

DETAILED DESCRIPTION OF THE PREFERRED EMBODIMENT

Figure 1:
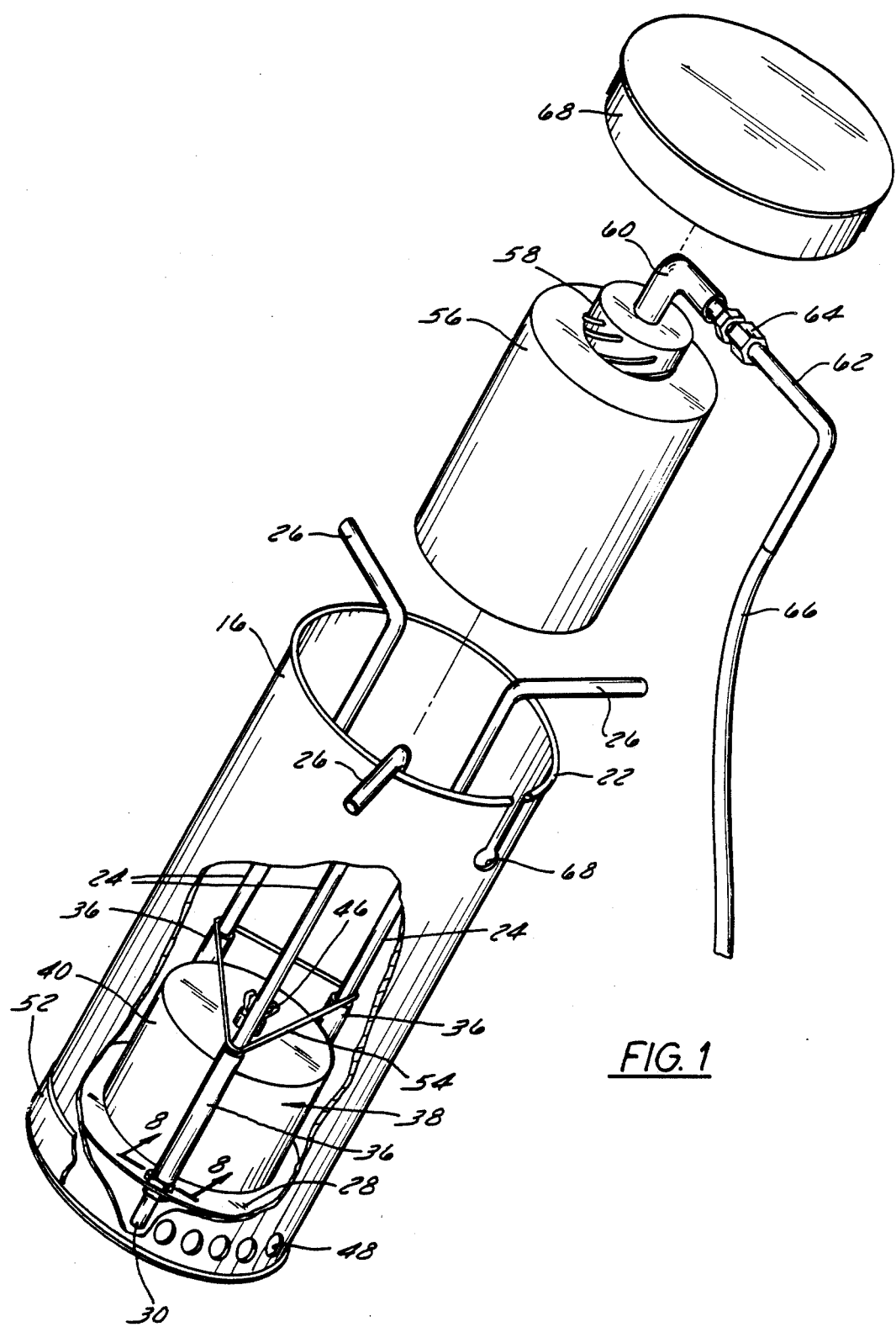
FIG. 1 is an exploded view, with portions broken away, of a heating device showing the preferred form of the invention.
Figure 6:
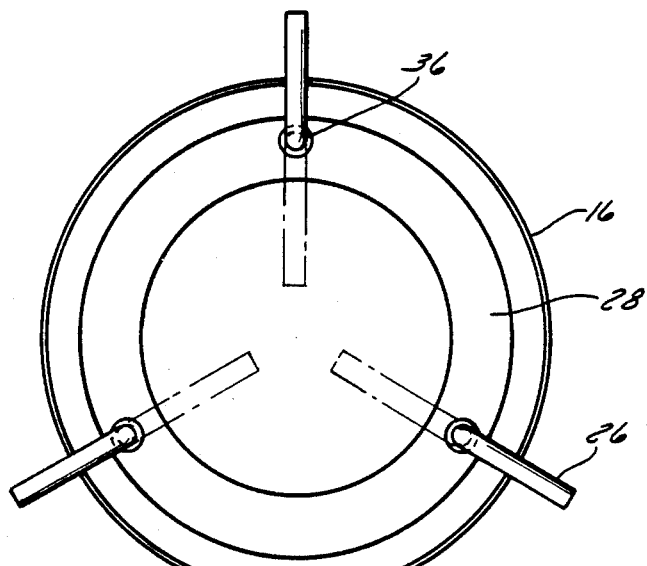
FIG. 6 is a top view of the heating device shown in FIG. 1 with parts removed to show the base plate and guide means of the present invention.
Figure 7:
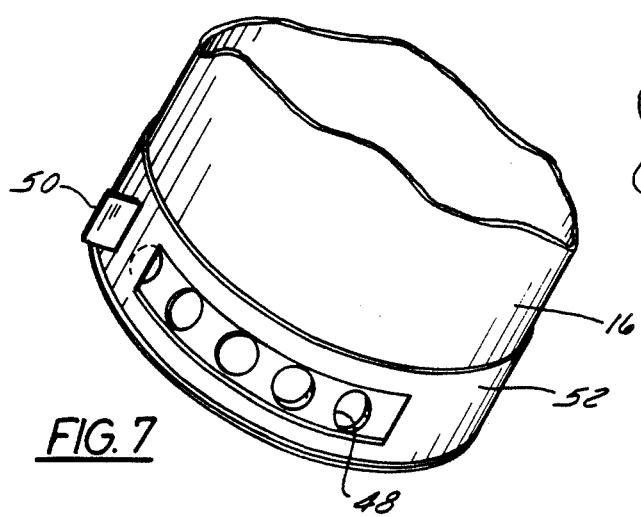
FIG. 7 is a fragmentary view of the bottom of the heating device shown in FIG. 1 illustrating the damper of the present invention.
Figure 9:
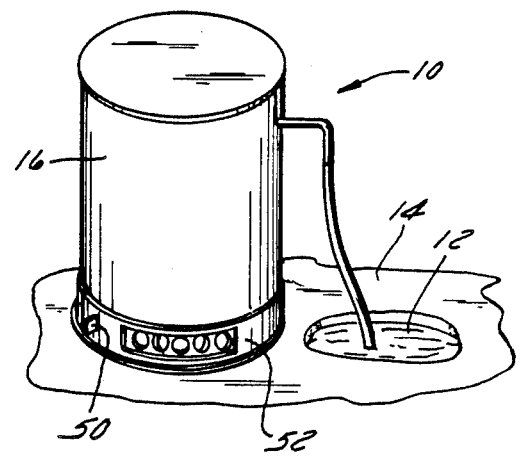
FIG. 9 is a perspective view of a heating device of the present invention shown in use.
Figure 8:
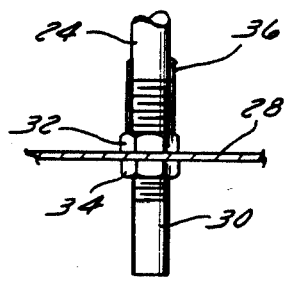
FIG. 8 is an enlarged sectional view taken along line 8—8 of FIG. 1 showing the connection of the base plate to the guide means of the present invention.

Referring now to the drawings wherein like reference characters designate identical or corresponding parts, a multi purpose heater 10 useful in ice fishing climates is best introduced through FIGS. 1 and 9. The heater 10 is placed adjacent a hole 12 formed in the ice layer 14 of any lake, stream, river or other suitable body of water containing fish or other marine life. Included in the heater 10 is a generally cylindrical, elongated housing 16 preferably formed of light sheet metal and having a bottom wall 18, side wall 20 and an open top 22. As detailed in FIGS. 6 and 8, three L-shaped guide rods 24 having integral, bent handle portions 26 are positioned axially of the housing 16 and pass through a circular base plate 28 (FIG. 4) at apertured positions 29 generally 120° apart. A lower portion 30 on each rod is threaded and provided with an upper nut 32 and a lower nut 34 between which the base plate 28 is sandwiched and effectively supported above the bottom wall 18 of the housing 16. A sleeve 36 resting upon the upper nut 32 rises upwardly and encircles each guide rod 24 forming the boundaries for maintaining the position of a disposable, self contained heat source 38 which is supported upon the base plate 28. The heat source 38 is preferably a liquid or gelled fuel housed in a container 40 having a flat bottom totally supported upon the base plate 28 or a stepped bottom, the center portion of which fits within the hole 42 in the base plate 28. Alternatively, the triangular base plate 44 illustrated in FIG. 5 may be employed to support the liquid fuel or heat source 38, which may have a woven wick 46 or a removable cover (not shown) for igniting the liquid or gelled fuel inside. A lower portion of the housing sidewall 20 is formed with vent holes 48 which may be selectively covered and uncovered by manipulation of a tab 50 on a rotatable collar 52 surrounding the housing 16, thereby serving as a damping device to control combustion of the heat source 38.

Resting upon the top of each sleeve 36 is a corner of a triangular wire framework 54 which circumscribes the three guide rods 24 and provides support for a fluid reservoir 56 overlying the heat source 38. The reservoir 56 is shown preferably as a cylindrical vessel having a screw on cap 58 from which a small, hollow elbow fitting 60 extends. An L-shaped metal tube 62 has an inner end screw threadly attached to the fitting 60 by means of nut 64 and has an outer end attached to a flexible, capillary rubber hose 66. Thus, there is communication from the interior of the reservoir 56 and through the fitting 60, tube 62 and hose 66. With the reservoir 56 maintained in place upon the framework 54 and by the guide rods 24, the tube 62 fits in a keyhole slot 68 formed in the upper portion of side wall 20 so that the tube 62 and hose 66 project beyond the housing 16 for alignment with the hole 12. By virtue of the rotatable fit of the lower portion of the guide rods 24 within the nuts 32, 34, the integral handles 26 are adjustable from an inboard position where they lie within the periphery or the housing 16 as shown in dotted lines of FIG. 6, to an outboard position where they extend radially outwardly from the housing 16. With the handles 26 in the inboard position, a protective, removable cover 70 is employed to close the top of the housing. As a feature of the invention, the guide rods 24, nuts 32, 34, base plate 28, sleeves 36, heat source 38, framework 54, and reservoir 56 collectively define a retractable heater core slidable into and out of the housing 16.

In use, once a hole has been bored in the ice to gain access to the water below, the fisherman removes the cover 70 and slides the core out to ignite the heat source 38 and fill the reservoir 56 with an evaporable fluid, preferably water conveniently available from the open hole 12 or another source. Following core and cover replacement, the heater 10 is placed on the ice to one side of the hole where it will not obstruct fishing and the hose 66 is placed in the hole 12. After a short warm-up period, the heat source 38 transforms fluid in the reservoir 56 to steam or vaporized heat delivered through the tube 62 and hose 66 to maintain the hole open. It should be appreciated the amount of vaporized heat produced is dependent upon the temperature of the heat source 38, the combustion rate of which is controlled by the damper device 48, 52. It should also be understood that the heater should be positioned at a location around the hole 12 which offers the optimum draft conditions for the result desired. Depending upon the outdoor temperature conditions, the hose 66 may be placed anywhere from the surface of the water to various depths in the water.

Turning now to FIGS. 2 and 3, a modified reservoir 56' which may be optionally used in lieu of reservoir 56 includes a percolating device in which the underside of a dish 72 communicates with a hollow stem 74. The stem 74 passes through a hole in the reservoir cover 58' and is fitted with a capillary hose 66' adapted to be placed in the hole. With this construction, the heat source 38 percolates fluid in the reservoir 56' so that vaporized heat in the condensed form of steam droplets and water is delivered to the hole 12 to prevent refreezing.

While the heating mode described above may inherently provide a degree of radiant heat, it is a distinct feature of the invention that the heater 10 is convertible to another auxiliary heating mode in which the cover 70 and fluid reservoir 56, 56' are removed and the heat source 38 is repositioned on the framework 54. In this arrangement, food and beverages supported upon the handles 26, whether inboard or outboard, may be efficiently heated and human extremities comfortably warmed at the top of the housing 16.

Unlike prior art devices, the present invention is designed to more efficiently prevent reformation of ice in a hole through the medium of vaporized heat generated by the particular arrangement of simple, inexpensively manufactured and maintained components. Use of the present invention does not introduce foreign structures around the entire periphery of the hole and thereby avoids those prior art problems of fishing line burning and entanglement as well as housing instability caused by melting ice. Additionally, the present invention eliminates the need for sometimes troublesome heat sources such as charcoal, gas and propane and simplifies previous designs using disposable liquid and gelled fuel sources.

Thus, it should be clear the present invention furnishes a lightweight yet sturdy arrangement for providing various heating functions during ice fishing. The preferred embodiment discloses a self-contained, portable heating device convertible between different modes to improve the comfort and efficiency of ice fishing.

While a particular embodiment of this heater arrangement has been shown and described, it will be obvious to persons skilled in the art that changes and modifications might be made without departing from the invention in its broader aspects. It is the aim of the dependent claims to cover all such changes and modifications as fall within the true scope and spent of the invention.

What is claimed is:

1. A heating device useful in ice fishing to prevent freezing of water within a hole cut in the ice and to provide auxiliary heating for comfort and cooking comprising:
   a housing adapted to be placed adjacent the hole in the ice;
   a reservoir containing evaporable fluid, said reservoir being separately located within said housing; and
   a heating means positioned within said housing cooperable with said reservoir for delivering vaporized heat to maintain the hole open, and operable for convectionally heating objects placed at the top of said housing, said reservoir being replaceable by said heating means to provide direct heating of objects placed at the top of said housing.

2. A heating device as recited in claim 1, wherein said reservoir includes means for percolating the fluid in said reservoir to the hole in the ice.

3. A heating device as recited in claim 1 wherein said device is self-contained and includes a cover on said housing.

4. A combination vapor and convection heating device for ice fishing comprising
   a housing having a bottom wall, a side wall and an open top;
   a displaceable heating means mounted within said housing;
   a movable reservoir containing evaporable fluid located at a position within said housing adjacent said heating means;
   guide means positioned within said housing for locating said heating means and said reservoir; and
   a removable cover engageable with the top of said housing,
   said device being constructed and arranged such that, in one mode, said heating means is cooperable with said reservoir to transfer vapor and liquid droplets to prevent freezing of water within a hole formed in the ice and in a second mode with said reservoir removed, said heating means is displaced to the position of said reservoir for providing convection heating to objects placed at the top of said housing.

5. A heating device as recited in claim 4 wherein, in said second mode, said cover is removed and said guide means are adjustable to provide support for objects to be heated at the top of said housing.

6. A heating device as recited in claim 4 wherein said heating means is a self-contained source comprising a vessel containing a flammable substance and having a combustible wick.

7. A heating device as recited in claim 4 including a support framework engageable with said guide means for supporting said reservoir.

8. A heating device as recited in claim 4, said heating means being suspended above the bottom wall of said housing and in communication with air outside said housing.

9. A multipurpose heating device useful in ice fishing comprising:
   a housing having a bottom wall, a side wall and an open top;
   a retractable heater core slidable into and out of said housing, said core including guide means extending axially of said housing, a displaceable, self-contained, combustion-type heating means located at the bottom of said core, and a removable reservoir containing evaporable fluid supported in said core above said heating means;
   a damping means formed in said housing for controlling combustion of said heating means; and
   a removable cover engageable with the top of said housing,
   whereby, in one mode, said heating means is cooperable with said reservoir to provide vaporized heat to prevent freezing of water within a hole cut in the ice and, in a second mode effected by replacement of said reservoir by said heating means, is able to provide direct heating for cooking objects and warming of human extremities placed at the top of said housing.

10. A heating device as recited in claim 9 wherein said guide means includes handles for removing said core from said housing, said handles being adjustable inside or outside the periphery of said housing to support objects to be heated.

11. A heating device as recited in claim 10 wherein said guide means further include three L-shaped rods, the upper portion of which form said handles.

* * * * *